(12) United States Patent
Sawamura et al.

(10) Patent No.: US 6,840,631 B2
(45) Date of Patent: Jan. 11, 2005

(54) ILLUMINATING APPARATUS, AND PROJECTOR USING THE ILLUMINATING APPARATUS

(75) Inventors: Shigeru Sawamura, Osaka (JP); Tsutomu Yoshikawa, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/131,160

(22) Filed: Apr. 24, 2002

(65) Prior Publication Data

US 2002/0122156 A1 Sep. 5, 2002

Related U.S. Application Data

(63) Continuation of application No. 09/677,030, filed on Sep. 29, 2000, now abandoned.

(30) Foreign Application Priority Data

Oct. 4, 1999 (JP) .............................................. 11-282507

(51) Int. Cl.⁷ ......................... G03B 21/28; G03B 21/00; G02B 5/04; H04N 9/12
(52) U.S. Cl. ............................. 353/81; 353/31; 353/99; 348/742; 348/771; 359/834; 359/837
(58) Field of Search ................................ 353/81, 98–99, 353/31; 348/742–743, 771; 359/833–834, 837

(56) References Cited

U.S. PATENT DOCUMENTS

| 3,659,918 | A | * | 5/1972 | Tan ............................. 313/371 |
| 3,932,027 | A | * | 1/1976 | Cook et al. .................. 359/583 |
| 6,005,722 | A | * | 12/1999 | Butterworth et al. ........ 359/712 |
| 6,155,687 | A | * | 12/2000 | Peterson ....................... 353/84 |
| 6,185,047 | B1 | * | 2/2001 | Peterson et al. ............. 359/640 |
| 6,371,617 | B1 | * | 4/2002 | Nishida et al. .............. 353/122 |
| 6,441,978 | B1 | * | 8/2002 | Kobayashi et al. .......... 359/834 |
| 6,474,818 | B1 | * | 11/2002 | Engle ........................... 353/84 |
| 6,478,431 | B1 | * | 11/2002 | Sawamura et al. ........... 353/81 |
| 6,491,398 | B2 | * | 12/2002 | Takeuchi et al. .............. 353/31 |

FOREIGN PATENT DOCUMENTS

| JP | 09-096867 A | 4/1997 |
| JP | 09-098442 A | 4/1997 |
| JP | 11-249037 A | 9/1999 |

* cited by examiner

*Primary Examiner*—Judy Nguyen
*Assistant Examiner*—Magda Cruz
(74) *Attorney, Agent, or Firm*—Sidley Austin Brown & Wood LLP

(57) ABSTRACT

An illuminating apparatus has a light source emitting illumination light; and a prism having a plurality of reflecting surfaces and reflecting the illumination light from said light source by the reflecting surfaces to thereby bend an illumination optical path at an obtuse angle.

18 Claims, 8 Drawing Sheets

ILLUMINATING APPARATUS, AND PROJECTOR USING THE ILLUMINATING APPARATUS

RELATED APPLICATION

This application is a continuation of Ser. No. 09/677,030 filed Sep. 29, 2000 now abandoned.

This application is based on application No. 11-282507 filed in Japan, the content of which is hereby incorporated by reference.

FIELD OF THE INVENTION

The present invention relates to an illuminating apparatus and a projector using the illuminating apparatus.

DESCRIPTION OF THE PRIOR ART

Recently, a digital micromirror device™ (DMD, manufactured by Texas Instruments Incorporated, hereinafter, referred to simply as digital micromirror device or DMD) has been receiving attention as a light modulation device (that is, display device) for a projector. The DMD has a display screen in which a multiplicity of micromirrors are arranged in a matrix. Each of the micromirrors constitutes one pixel of the display image. For light modulation, the inclination of each micromirror is independently controlled. The micromirrors can assume two inclination states of an ON state and an OFF state. At the micromirrors in the ON state, illumination light is reflected toward the inside of the projection optical system, and at the micromirrors in the OFF state, illumination light is reflected toward the outside of the projection optical system. Consequently, only the light reflected at the micromirrors in the ON state reaches the surface onto which light is to be projected (for example, the screen surface) through the projection optical system, so that a display image comprising light and dark patterns is formed on the surface onto which light is to be projected.

A first conventional example of a projector having the DMD is shown in FIGS. 5 and 6. FIG. 5 is a front view of the first conventional example viewed from the backside of a DMD 7. FIG. 6 is a top view of the first conventional example viewed from above. In the figures, AX1 represents the optical axis of the illumination system, and AX2 represents the optical axis of the projection system. The illumination light emitted from a light source 1 first passes through a color wheel 2 and then has its illuminance distribution uniformmized by being incident on an integrator rod 3. The illumination light having exited from the integrator rod 3 passes through first and second relay lenses 4a and 4b and then has its optical path bent obliquely upward by being reflected at a plane mirror 5.

The illumination light reflected at the plane mirror 5 passes through a third relay lens 4c and then has its angle changed in a TIR (total internal reflection) prism 6 to illuminate the DMD7 obliquely from an angle of 45 degrees. Since the DMD7 is structured so that the micromirrors thereof can assume the two inclination states (the ON state and the OFF state), the illumination light is reflected toward a projection optical system 8 at the micromirrors in the ON state and the illumination light is reflected toward the outside of the projection optical system 8 at the micromirrors in the OFF state. Consequently, the light reflected at the micromirrors in the ON state and then transmitted by the TIR prism 6 is incident on the projection optical system 8, thereby forming a display image on the surface onto which light is to be projected (not shown).

FIGS. 7(A) and 7(B) show a second conventional example of the projector having the DMD 7. FIG. 7(A) is a top view of the second conventional example viewed from above. FIG. 7(B) is a front view of the second conventional example viewed from the backside of the DMD7. In the figures, elements the same as and corresponding to those of the first conventional example are designated by the same reference numerals. The illumination light emitted from a light source 1 first passes through a color wheel 2 and then has its illuminance distribution uniformized by being incident on an integrator rod 3. The illumination light having exited from the integrator rod 3 passes through a first relay lens 4a and then has its optical path bent obliquely downward by being reflected at a first plane mirror 5a. The illumination light reflected at the first plane mirror 5a passes through a second relay lens 4b and then has its optical path bent obliquely upward by being reflected at a second plane mirror 5b.

The illumination light reflected at the second plane mirror 5b passes through a third relay lens 4c and then has its angle changed in a TIR prism 6 to illuminate the DMD7 obliquely at an angle of 45 degrees. Like the first conventional example, since the DMD7 is structured so that the micromirrors thereof can assume the two inclination states (the ON state and the OFF state), the illumination light is reflected toward a projection optical system 8 at the micromirrors in the ON state and the illumination fight is reflected toward the outside of the projection optical system 8 at the micromirrors in the OFF state. Consequently, the light reflected at the micromirrors in the ON state and then transmitted by the TIR prism 6 is incident on the projection optical system 8, thereby forming a display image on the surface onto which light is to be projected (not shown).

Presently, compact mobile projectors are in demand on the market. Particularly, one being small in height under a condition where the light source 1 is horizontally situated is in demand. However, in the first conventional example, since the illumination optical path is bent at an acute angle in order that the plane mirror 5 is not large in size, the height is large in view of the disposition of the relay lenses 4a and 4b and the like. On the contrary, the second conventional example is small in height and has a small base area. However, since it is difficult to secure space for disposing components such as an electric component system, the overall size of the projector is large. In addition, since the light source 1 is surrounded by other components, it is difficult to cool the light source 1.

SUMMARY OF THE INVENTION

An object of the present invention is to provide an improved illuminating apparatus and a projector using the projector.

Another object of the present invention is to provide a particularly compact projector, and an illuminating apparatus for a projector, being advantageous in reducing the size of the projector and disposing other components.

The above-mentioned objects are achieved by an illuminating apparatus for a projector, having a prism that bends the illumination optical path at an obtuse angle by a plurality of reflecting surfaces.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 5:
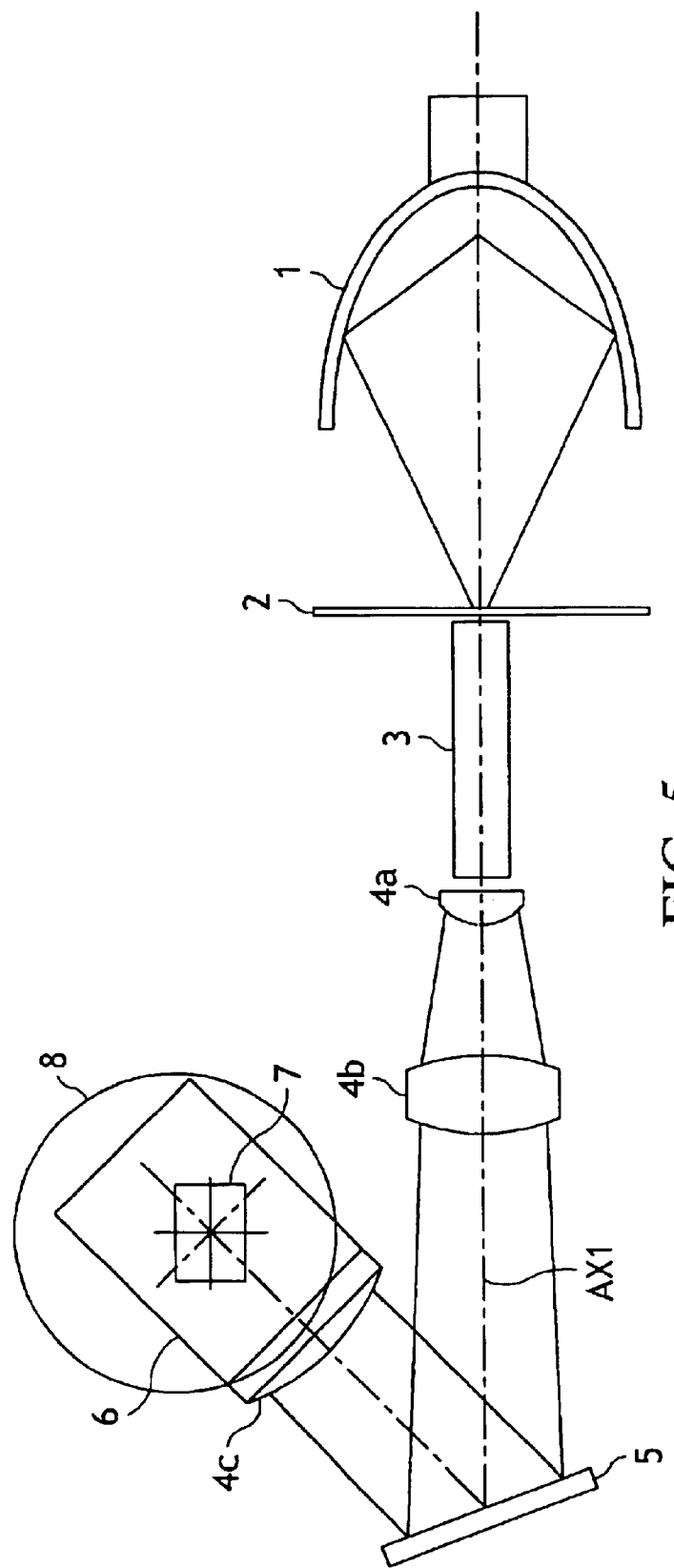
FIG. 5 is a front view briefly showing the optical structure of the first conventional example.
Figure 6:
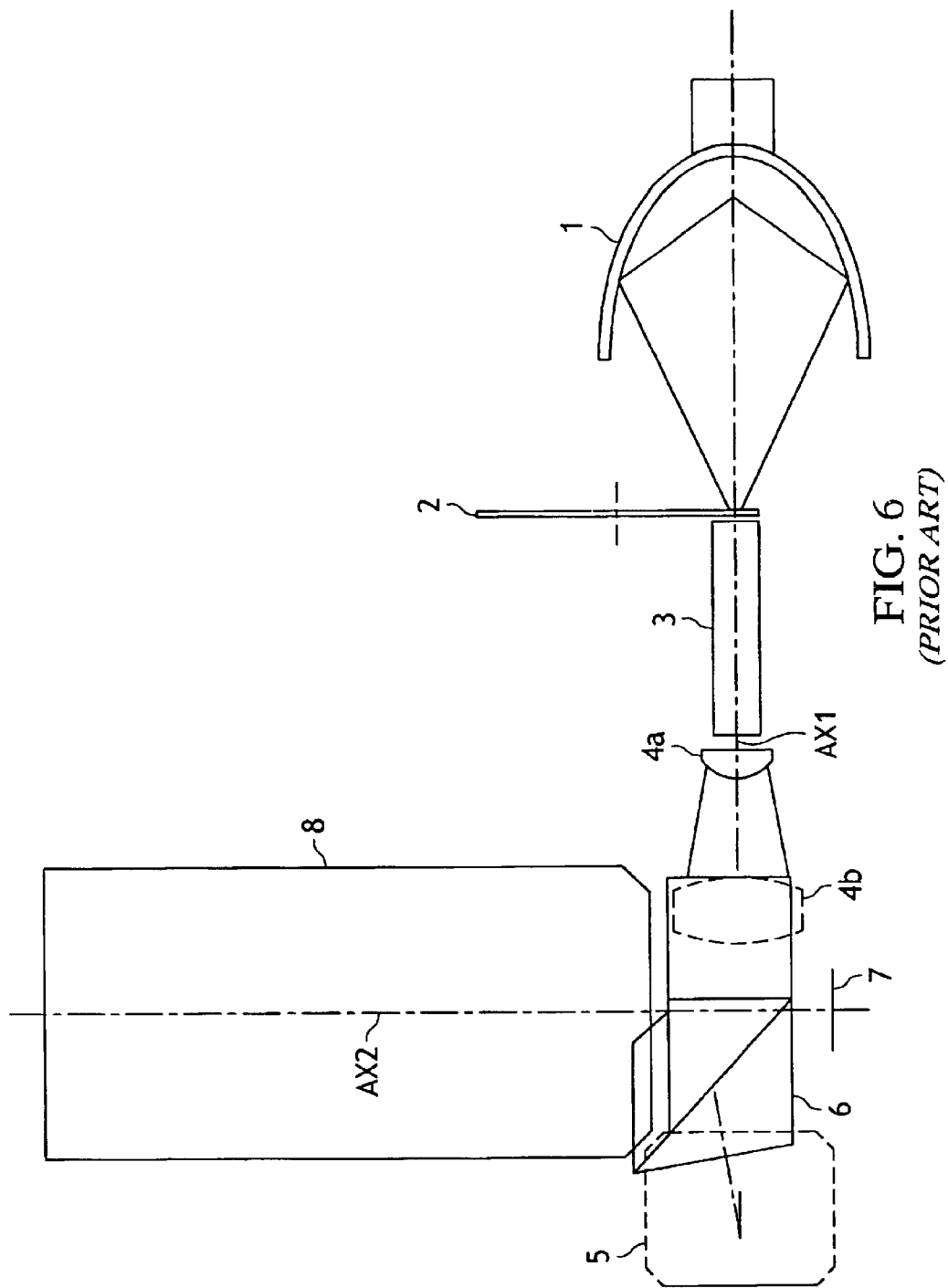
FIG. 6 is a top view briefly showing the optical structure of the first conventional example.
Figure 7A:
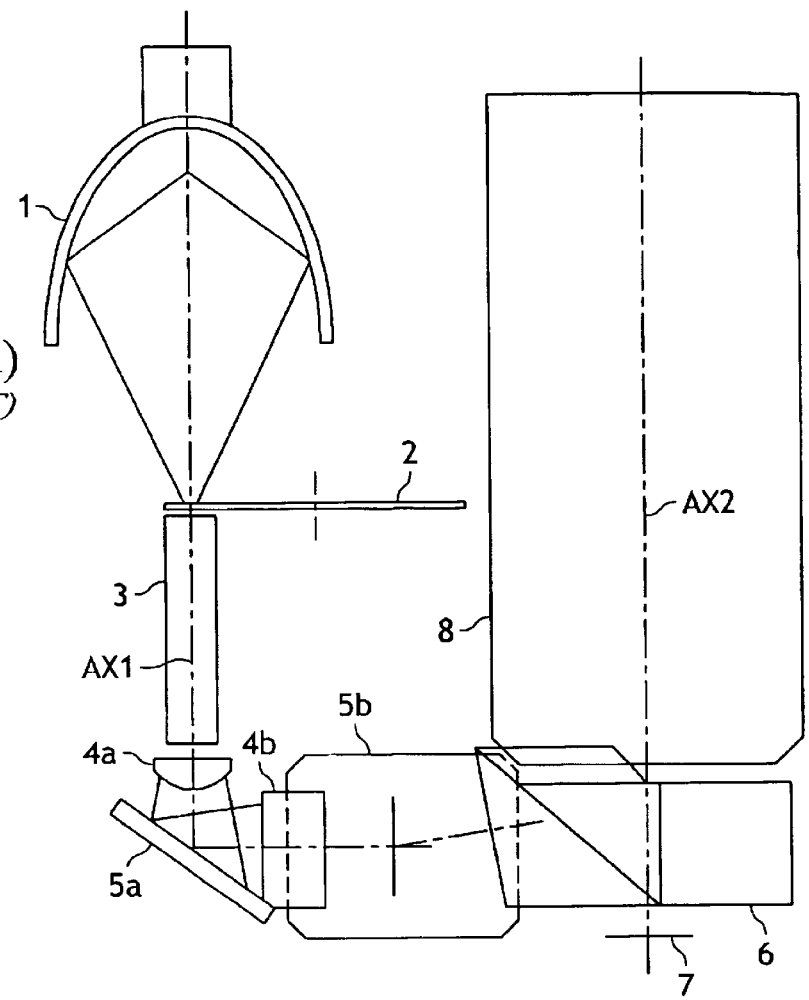
FIGS. 7(A) and 7(B) briefly show the optical structure of the second conventional example viewed from above and from the front.
Figure 7B:
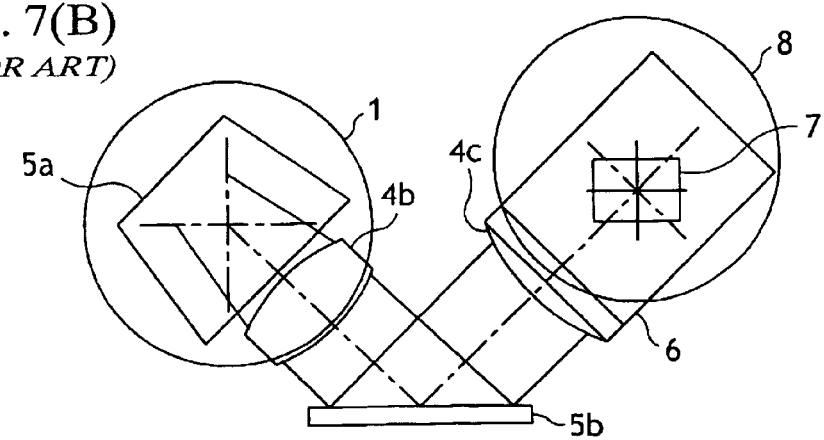

Hereinafter, an illuminating apparatus and a projector embodying the present invention will be described with reference to the drawings. Elements of the embodiments the same as and corresponding to those of the conventional examples (FIGS. 5 to 7) are designated by the same reference numerals, and descriptions thereof are omitted.

Figure 1:
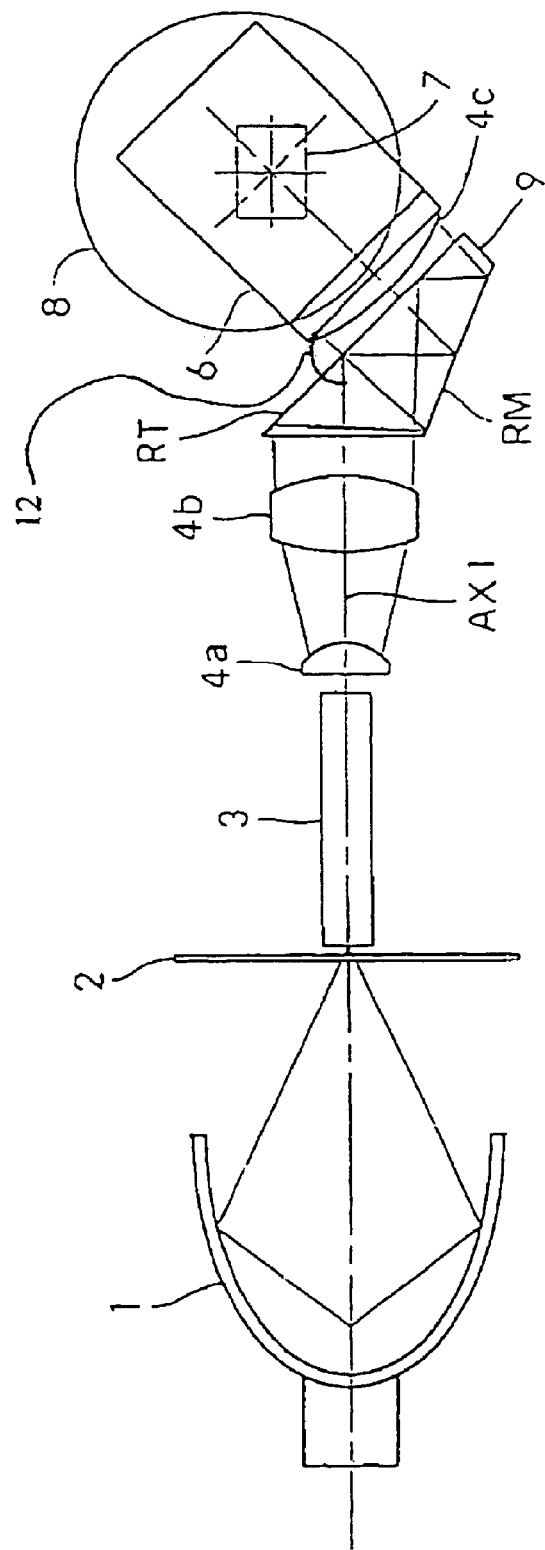
FIG. 1 is a front view briefly showing the optical structure of a first embodiment.
Figure 2:
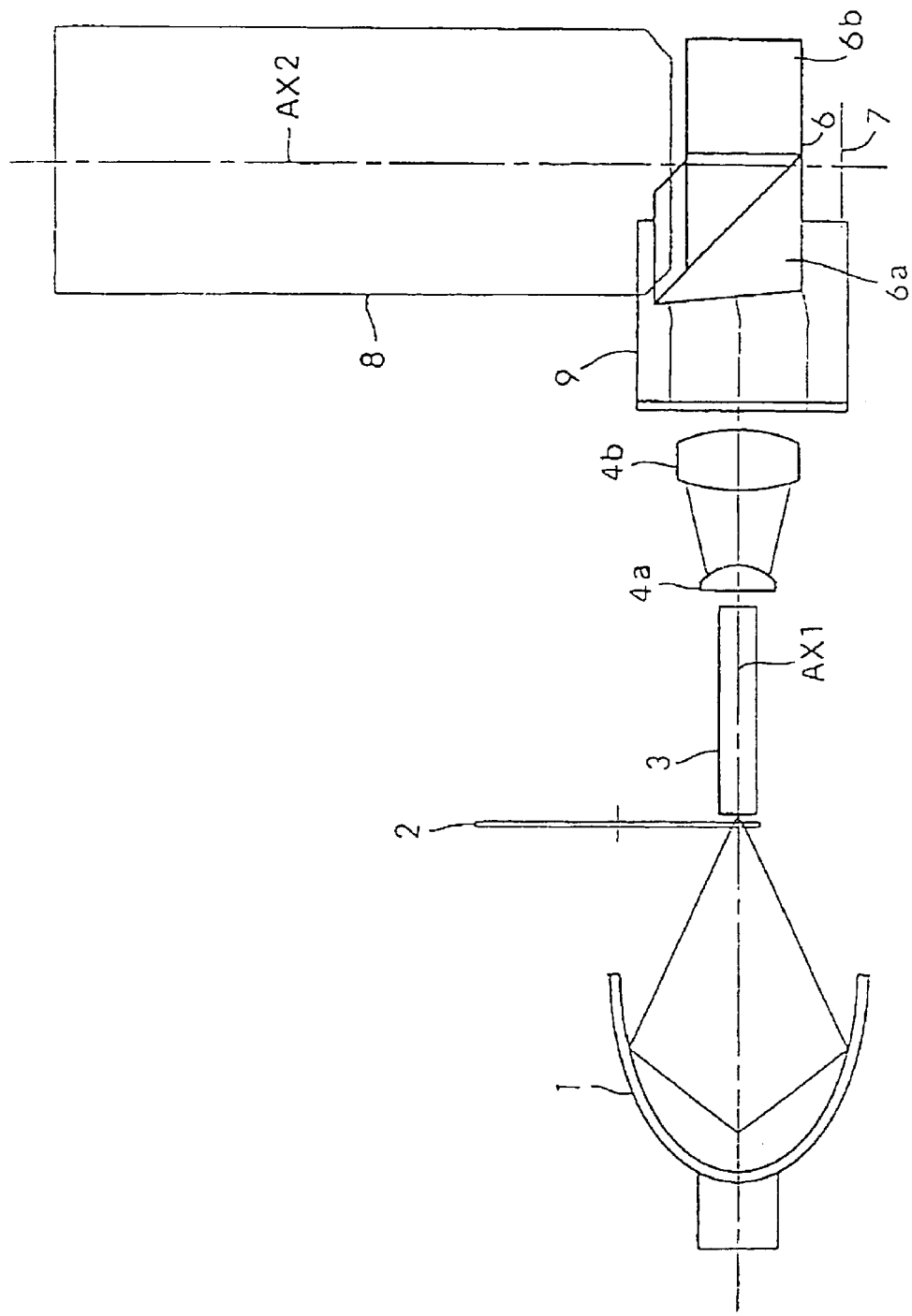
FIG. 2 is a top view briefly showing the optical structure of the first embodiment.

FIGS. 1 and 2 show the optical structure of a first embodiment. FIG. 1 is a front view of the projector viewed from the backside of a DMD7. FIG. 2 is a top view of the projector viewed from above. The projector has an illuminating apparatus, the DMD7 for modulating the illumination light from the illuminating apparatus, and a projection optical system 8 for projecting the light modulated by the DMD which is a display device. The illuminating apparatus comprises a light source 1, a color wheel 2, an integrator rod 3, first to third relay lenses 4a to 4c, a TIR prism 6 and a prism 9.

The illumination light emitted from the light source 1 first passes through the color wheel 2. The color wheel 2 comprising a plurality of color filters R, G and B transmitting different colors of light is rotatable by a motor or the like so that the color of the projected light is successively changed at predetermined time intervals. The illumination light having passed through the color wheel 2 has its illuminance distribution uniformized by being incident on the integrator rod 3. The uniformization of the illuminance distribution eliminates the difference between the axial illuminance and the most off-axialilluminance on the display screen of the DMD7.

The illumination light having exited from the integrator rod 3 passes through the first and the second relay lenses 4a and 4b and is then incident on the square pole prism 9. The illumination light incident on the prism 9 is totally reflected at a reflecting surface RT, is mirror-reflected at a reflecting surface RM, and then passes through the reflecting surface RT to exit from the prism 9 at an obtuse angle 12 relative to the path of the illumination light upon entering prism 9. That is, by the two reflecting surfaces RT and RM in the prism 9, the illumination optical path is bent obliquely upward at obtuse angle 12. In other words, the illuminating apparatus is structured so that the angle of deviation by the prism 9 is obtuse. Here, total reflection refers to a phenomenon in which light to be incident on a low-refractive-index medium at an angle more than the critical angle is completely reflected at the interface surface, and mirror reflection refers to a phenomenon in which light incident on a reflecting surface formed so as to have a predetermined high reflectance is reflected in accordance with the angle of incidence.

The illumination light having its optical path bent by the prism 9 passes through the third relay lens 4c and then has its angle changed in the TIR prism 6. The TIR prism 6 comprises a first prism 6a and a second prism 6b (FIG. 2). By the TIR prism 6, the light incident on the DMD7 and the output light are separated. Since the third relay lens 4c is cemented to the first prism 6a, the illumination light having passed through the third relay lens 4c is incident on the first prism 6a as it is. The illumination light incident on the first prism 6a is totally reflected at the reflecting surface opposed to the second prism 6b (the opposing surfaces of the first and the second prisms 6a and 6b are disposed substantially parallel to each other with a predetermined distance in between) to illuminate the DMD7 obliquely at an angle of 45 degrees. The illumination light is modulated by being reflected at the DMD.

Since the DMD7 is structured so that the micromirrors thereof can assume the two inclination states (the ON state and the OFF state), the illumination light is reflected toward the projection optical system 8 at the micromirrors in the ON state and the illumination light is reflected toward the outside of the projection optical system 8 at the micromirrors in the OFF state. Consequently, the light reflected at the micromirrors in the ON state and then transmitted by the TIR prism 6, first by the first prism 6a and then by the second prism 6b, is incident on the projection optical system 8, thereby forming a display image on the surface onto which light is to be projected (not shown).

According to the illumination system structure of the projector, since the illumination optical path is bent at obtuse angle 12 by the prism 9 disposed inside the relay system (4a to 4c) before the illumination light is incident on the TIR prism 6, no limit to disposition is imposed by the relay lenses 4a and 4b and the like. Consequently, the height under a condition where the light source 1 is horizontally disposed is small, so that the projector is easily made thin and compact. The difference is clear when this embodiment is compared with the first conventional example (FIG. 5) in which the illumination optical path is bent at an acute angle by the plane mirror 5. Moreover, since the illuminating apparatus is disposed within a plane substantially vertical to the optical axis AX2 of the projection optical system, the disposition of other components (an electric component system, etc.) is easy compared to the second conventional example (FIGS. 7(A) and 7(B)).

Figure 8:
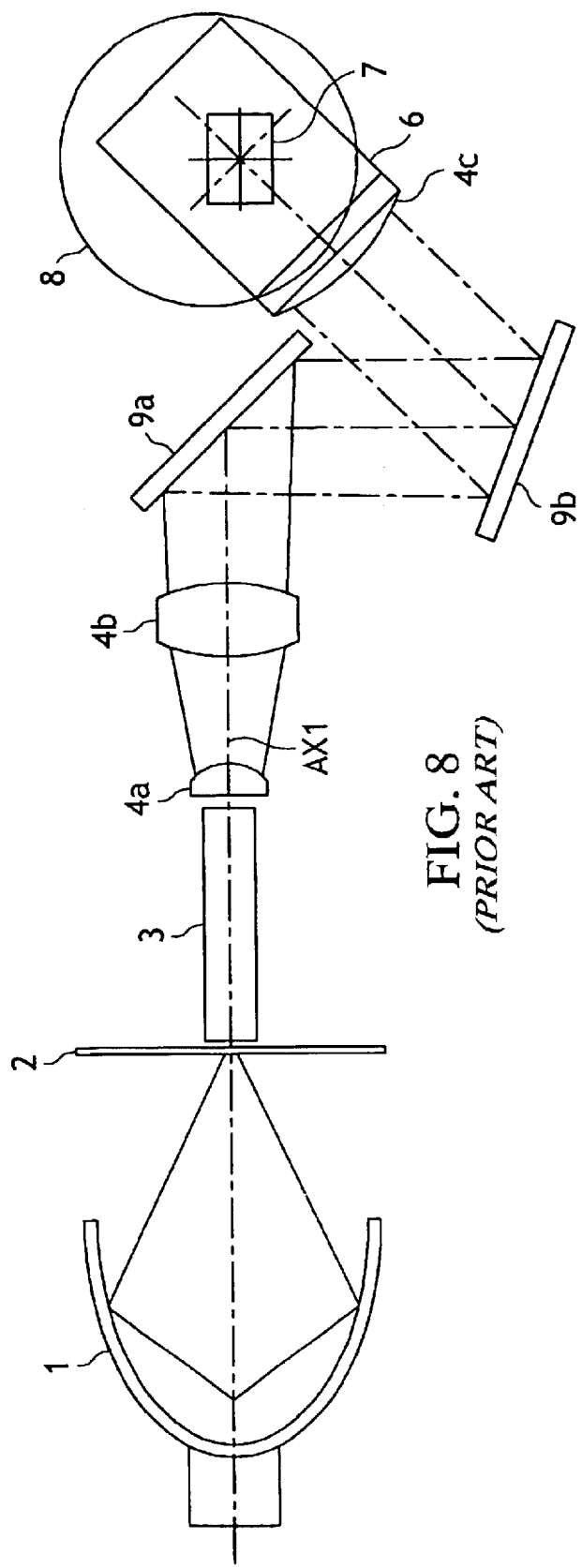
FIG. 8 is a front view briefly showing the optical structure of a comparative example.

The prism 9 for bending the illumination optical path has one totally reflecting surface RT and one mirror-reflecting surface RM, and the reflecting surface RT performing total reflection serves also as the exit surface which is a transmitting surface. When the prism 9 performing total reflection and mirror reflection inside as described above is used, the illumination optical path is folded in the prism 9, so that the optical path length is compressed. Consequently, size reduction as an optical system is achieved. Moreover, by using the prism 9, the illumination optical path can be bent at obtuse angle 12 without the use of a large reflecting surface. A comparative example using two plane mirrors 9a and 9b instead of the prism 9 in this embodiment is shown in FIG. 8. As is apparent from FIG. 8, when the two plane mirrors 9a and 9b are used, it is necessary to spatially largely separate the illumination optical path, so that the height of the projector increases.

Figure 3:
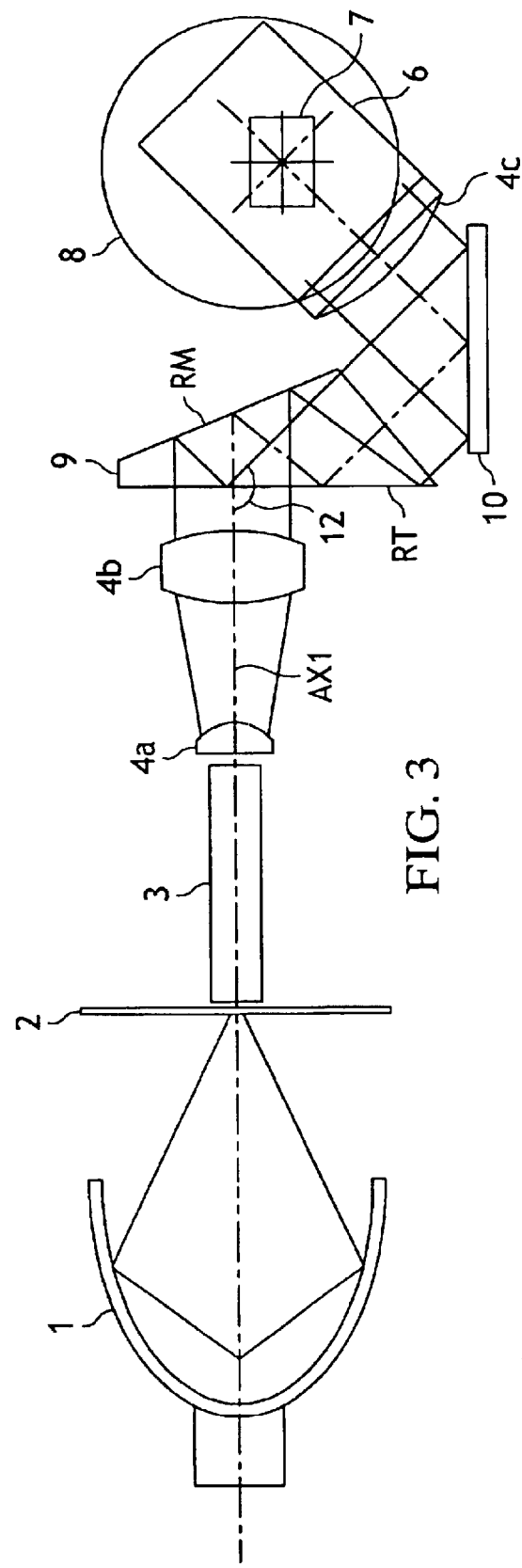
FIG. 3 is a front view briefly showing the optical structure of a second embodiment.
Figure 4:
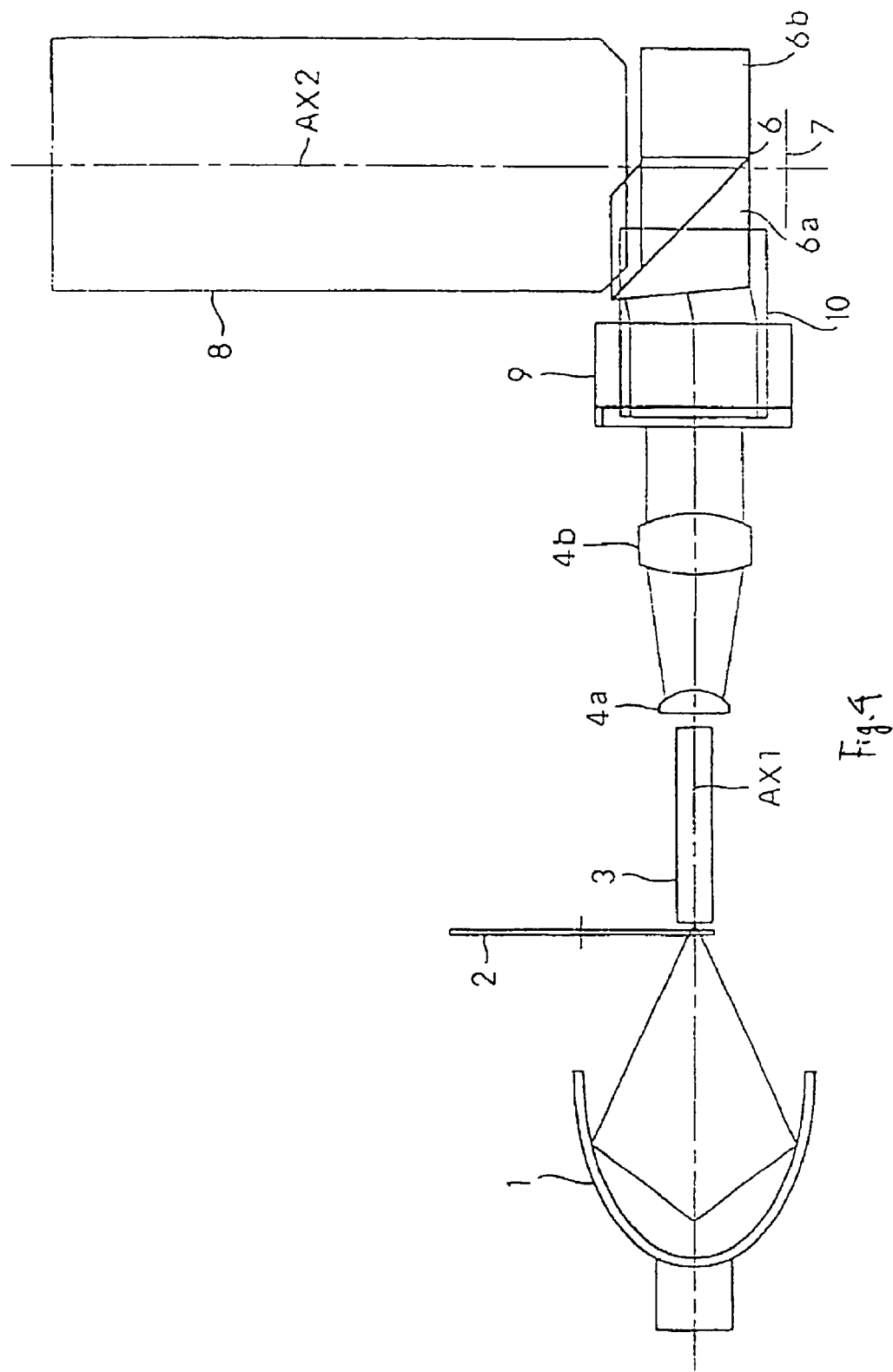
FIG. 4 is a top view briefly showing the optical structure of the second embodiment.

FIGS. 3 and 4 show the optical structure of a second embodiment. FIG. 3 is a front view of the projector viewed from the backside of the DMD7. FIG. 4 is a top view of the projector viewed from above. Features of this embodiment include that a plane mirror 10 for bending the illumination optical path between the prism 9 and the third relay lens 4c is disposed and that the prism 9 is disposed so that the positions of the incident surface and the exit surface are different. Except these, the structure is similar to that of the first embodiment, and the effects are the same as those of the first embodiment.

In the second embodiment, the prism 9 for bending the illumination optical path has one totally reflecting surface RT and one mirror-reflecting surface RM, and the reflecting surface RT performing total reflection is also used as the incident surface which is a transmitting surface. By the reflecting surface RT being the incident surface, space for disposing the plane mirror 10 can be secured, and the addition of the plane mirror 10 improves the degree of freedom of the optical disposition. For example, by turning the mirror-reflecting surface RM, the optical disposition when the projector is viewed from above can be controlled to a certain extent.

As described above, by using the illuminating apparatus according to the present invention, the illumination optical path is bent at obtuse angle 12 by the prism, so that the projector is easily made compact. For example, the height of the projector under a condition where the light source is horizontally disposed can be reduced. Moreover, since the illuminating apparatus can be disposed within a plane substantially vertical to the optical axis of the projection optical system, other components (an electric component system, etc.) can be easily disposed.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An illuminating apparatus for illuminating a display device with an illumination light, the display device modulating the illumination light emitted from a light source, the illumination apparatus comprising:
   a single prism having a plurality of reflecting surfaces and reflecting the illumination light from said light source off of at least two of the reflecting surfaces to thereby bend the illumination light to an illumination optical path directed to said display device at an obtuse angle relative to an incoming path of the illumination light as it enters the prism.

2. An illuminating apparatus as claimed in claim 1, wherein said prism has two internal reflecting surfaces, and at least one of the internal reflecting surfaces totally reflects the illumination light.

3. An illuminating apparatus as claimed in claim 2, wherein said illumination light enters through a first surface of said prism, is mirror-reflected at a second reflecting surface, is incident on the first surface at an incidence angle more than a critical angle to be totally reflected, and exits through a third surface.

4. An illuminating apparatus as claimed in claim 2, wherein said illumination light enters through a first surface of said prism, is incident on a second surface at an angle more than a critical angle to be totally reflected, is reflected at a mirror-reflecting surface at a third surface, and is then incident on the second surface at an incidence angle not more than the critical angle to exit through the second surface.

5. An illumination apparatus as claimed in claim 1, further comprising an integrator disposed between the light source and the single prism in order to alleviate a difference between axial illuminance and off-axial illuminance of the illumination light emitted from the light source.

6. An illuminating apparatus for illuminating a display device with an illumination light, the display device modulating the illumination light emitted from a light source, the illumination apparatus comprising:
   an integrator disposed on an optical path in order to alleviate a difference between axial illuminance and off-axial illuminance of illumination light emitted from the light source;
   a relay lens system shaping the illumination light having exited from the integrator; and
   a single prism disposed in the relay lens system, having a plurality of reflecting surfaces, and reflecting the illumination light from said light source off of at least two of the reflecting surfaces to thereby bend the illumination light to an illumination optical path at an obtuse angle relative to an incoming path of the illumination light as it enters the prism.

7. An illuminating apparatus as claimed in claims 6, wherein as the reflecting surfaces, said prism has two internal reflecting surfaces, and at least one of the internal reflecting surfaces totally reflects the illumination light.

8. An illuminating apparatus as claimed in claim 7, wherein said illumination light enters through a first surface of said prism, is mirror-reflected at a second reflecting surface, is incident on the first surface at an incidence angle more than a critical angle to be totally reflected, and exits through a third surface.

9. An illuminating apparatus as claimed in claim 7, wherein said illumination light enters through a first surface of said prism, is incident on a second surface at an angle more than a critical angle to be totally reflected, is reflected at a mirror-reflecting surface at a third surface, and is then incident on the second surface at an incidence angle not more than the critical angle to exit through the second surface.

10. A projector comprising:
    a light source emitting an illumination light;
    a single prism having a plurality of reflecting surfaces and reflecting the illumination light from said light source off of at least two of the reflecting surfaces to thereby bend the illumination light to an illuminating optical path at an obtuse angle relative to an incoming path of the illumination light as it enters the prism;
    a display device being illuminated by the illumination light and modulating the illumination light so as to exit as image light; and
    a projection optical system projecting, in a predetermined image surface position, the image light obtained by modulating the illumination light by the display device.

11. A projector as claimed in claim 10, wherein as the reflecting surfaces, said prism has two internal reflecting surfaces, and at least one of the internal reflecting surfaces totally reflects the illumination light.

12. A projector as claimed in claim 11, wherein said illumination light enters through a first surface of said prism, is mirror-reflected at a second reflecting surface, is incident on the first surface at an incidence angle more than a critical angle to be totally reflected, and exits through a third surface.

13. A projector as claimed in claim 11, wherein said illumination light enters through a first surface of said prism, is incident on a second surface at an angle more than a critical angle to be totally reflected, is reflected at a mirror-reflecting surface at a third surface, and is then incident on the second surface at an incidence angle not more than the critical angle to exit through the second surface.

14. A projector as claimed in claim 10, wherein said display device is a digital micromirror device.

15. A projector as claimed in claim 10, wherein an integrator is disposed between said light source and said prism.

16. A projector as claimed in claim 10, wherein a color wheel is disposed between said light source and said prism.

17. A projector as claimed in claim 10, wherein said display device is a reflective type display device, and a total reflection prism for separating an optical path of the illumination light incident on said display device and an optical path of the image light reflected at the display device is disposed between said light source and said display device.

18. A projector as claimed in claim 10, wherein said display device is a digital micromirror device.

* * * * *

UNITED STATES PATENT AND TRADEMARK OFFICE
CERTIFICATE OF CORRECTION

PATENT NO. : 6,840,631 B2
DATED : January 11, 2005
INVENTOR(S) : Shigeru Sawamura et al.

It is certified that error appears in the above-identified patent and that said Letters Patent is hereby corrected as shown below:

Title page,
Item [75], Inventors, delete "Shigeru Sawamura, Osaka (JP); Tsutomu Yoshikawa, Oska (JP)" and insert -- Shigeru Sawamura, Sakai (JP); Tsutomu Yoshikawa, Kashihara (JP) --.

Column 1,
Line 48, delete "unifommized" and insert -- unformized --.

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,840,631 B2
APPLICATION NO. : 10/131160
DATED : January 11, 2005
INVENTOR(S) : Shigeru Sawamura et al.

It is certified that error appears in the above-identified patent and that said Letters Patent is hereby corrected as shown below:

Title page,
Item [75], Inventors, delete "Shigeru Sawamura, Osaka (JP); Tsutomu Yoshikawa, Osaka (JP)" and insert -- Shigeru Sawamura, Sakai (JP); Tsutomu Yoshikawa, Kashihara (JP) --.

Column 1,
Line 48, delete "unifommized" and insert -- uniformized --.

This certificate supersedes Certificate of Correction issued April 26, 2005.

Signed and Sealed this

Twelfth Day of September, 2006

JON W. DUDAS
*Director of the United States Patent and Trademark Office*